United States Patent [19]

Oyamada

[11] Patent Number: 4,876,537
[45] Date of Patent: Oct. 24, 1989

[54] PAGER RECEIVER INCLUDING A LIGHT EMITTING AND A LIGHT SENSING ELEMENT ADJACENT TO A TRANSLUCENT PORTION OF A RECEIVER HOUSING

[75] Inventor: Takashi Oyamada, Tokyo, Japan

[73] Assignee: NEC Corporation, Tokyo, Japan

[21] Appl. No.: 138,274

[22] Filed: Dec. 28, 1987

[30] Foreign Application Priority Data

Dec. 25, 1986 [JP] Japan .......................... 61-201950[U]
Dec. 25, 1986 [JP] Japan .......................... 61-201951[U]

[51] Int. Cl.$^4$ ............................................. H04B 5/04
[52] U.S. Cl. .......................... 340/825.44; 340/825.48; 340/311.1; 455/351
[58] Field of Search ...................... 340/825.44, 825.47, 340/825.48, 311.1, 312, 313, 700, 765; 379/56, 57; 455/351

[56] References Cited

U.S. PATENT DOCUMENTS

| | | | |
|---|---|---|---|
| 4,367,467 | 1/1983 | Emile, Jr. .............................. | 340/765 |
| 4,558,396 | 12/1985 | Kawabata et al. ................... | 340/700 |
| 4,644,350 | 2/1987 | Ishii .................................... | 340/311.1 |
| 4,654,631 | 3/1987 | Kurcbart et al. ................. | 340/311.1 |
| 4,713,659 | 12/1987 | Oyagi et al. ........................ | 340/311.1 |
| 4,754,275 | 6/1988 | Abbaticchio et al. ........... | 340/311.1 |

*Primary Examiner*—Gerald Brigance
*Attorney, Agent, or Firm*—Sughrue, Mion, Zinn, Macpeak & Seas

[57] ABSTRACT

For simplifying a pager housing (14) containing a light sensing and a light emitting element (36 and 38), the housing has a common translucent portion (30). The light sensing and the light emitting elements are disposed adjacent to the translucent portion. The light emitting element is for indicating reception of a call. The light sensing element is useful to control operation of a display element (42) which is displaying a message and other. Preferably, the housing comprises holding arrangements for holding a protecting plate (24) for the display element. The holding arrangements are engaged with both ends of the protecting plate.

7 Claims, 3 Drawing Sheets

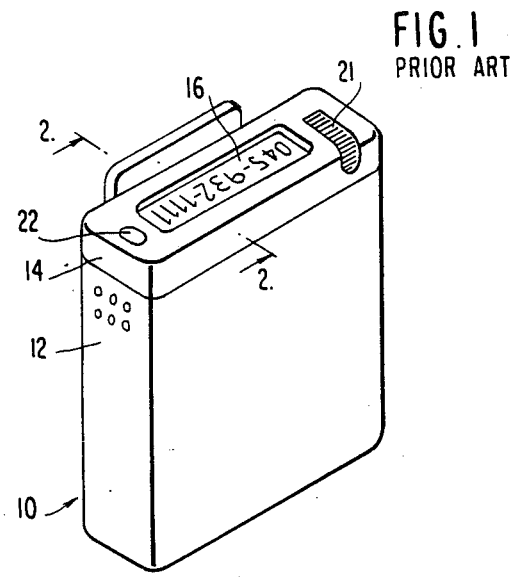
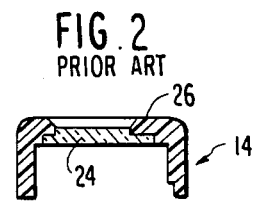
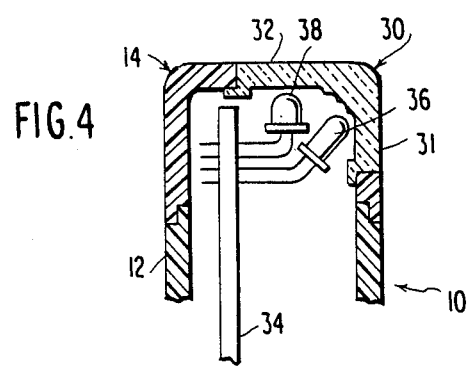
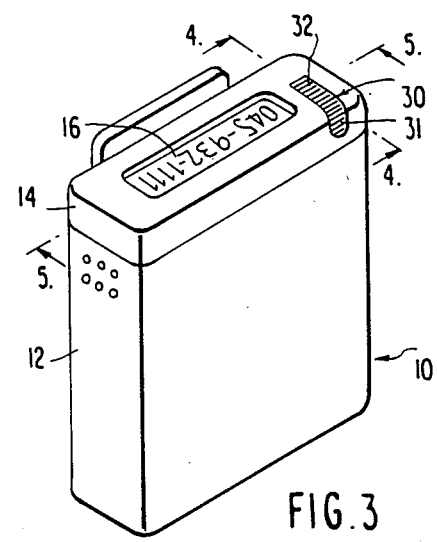
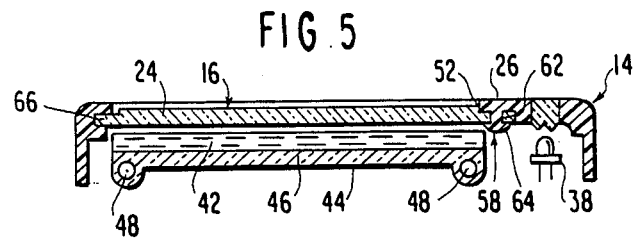

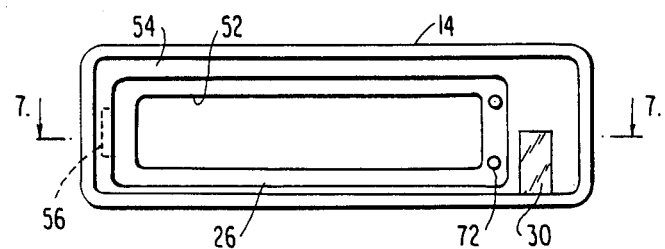
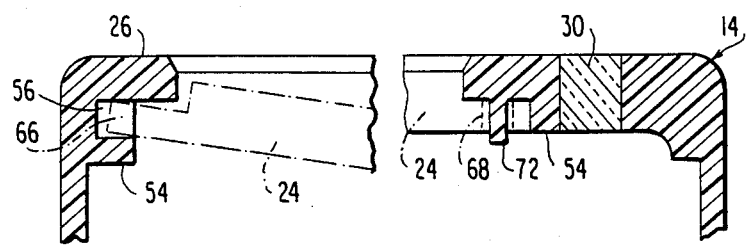
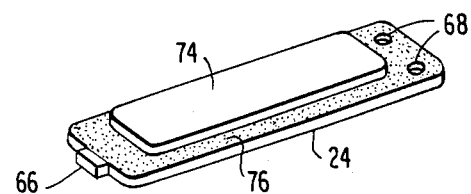

PAGER RECEIVER INCLUDING A LIGHT EMITTING AND A LIGHT SENSING ELEMENT ADJACENT TO A TRANSLUCENT PORTION OF A RECEIVER HOUSING

BACKGROUND OF THE INVENTION

This invention relates to a pager receiver including a display panel which is for displaying a message and others.

Various pager receivers of the type are already known. For example, a pager receiver is disclosed in U.S. Pat. No. 4,644,350 issued to Daisuke Ishii and assigned to NEC Corporation. The pager receiver comprises, in its housing, a light emitting element, a light sensing element, and an illuminating element as will presently be described.

The housing has a display panel and two translucent portions such as openings which are closed by translucent members, respectively. The light emitting element is for indicating reception of a call and is disposed adjacent to a selected one of the translucent portions. The light sensing element is for sensing an illuminance at the other of the translucent portions. The illuminating element is for illuminating the display panel when the illuminance is below a threshold value.

With the pager receiver, it is always possible to display a message on the display panel when the display panel should be watched with the pager receiver used in an atomsphere of a high luminance. In addition, it is possible to avoid uselessly consuming a great amount of electric power. This is because the illuminating element is not driven when the illuminance is equal to or more than the threshold value.

However, the pager receiver is disadvantageous in that it is hard to inexpensively manufacture the housing and that a limitation is much in regard to the design of the pager receiver as will later be discussed.

SUMMARY OF THE INVENTION

It is therefore an object of the present invention to provide a pager receiver which is capable of being manufactured at a relatively low cost in spite of including a light emitting and a light sensing element.

It is another object of this invention to provide a pager receiver of the type described, which is advantageous in regard to the design thereof.

Other object of this invention will become clear as the description proceeds.

According to this invention, there is provided a pager receiver comprising, in a housing having a display panel and a translucent portion, a light emitting element for indicating reception of a call, a light sensing element for sensing an illuminance at the translucent portion to produce a control signal representative of the illuminance, and an illuminating element for illuminating the display panel when the illuminance represented by the control signal is below a threshold value. In the pager receiver, the light emitting element is disposed adjacent to the translucent portion.

BRIEF DESCRIPTION OF THE DRAWING

FIG. 1 is a perspective view of a conventional pager receiver;

FIG. 2 is a sectional view of a cover member of the pager receiver taken along a line 2—2 of FIG. 1;

FIG. 3 is a perspective view of a pager receiver according to an embodiment of this invention;

FIG. 4 is a partial sectional view taken along a line 4—4 in FIG. 3;

FIG. 5 is a partial sectional view taken along a line 5-5 in FIG. 3;

FIG. 6 is a bottom view of a cover member of the pager receiver shown in FIG. 3;

FIG. 7 is an enlarged sectional view taken along a line 7—7 in FIG. 6; and

FIG. 8 is a perspective view of a protecting plate included in a display panel of the pager receiver shown in FIG. 3.

DESCRIPTION OF THE PREFERRED EMBODIMENT:

Referring to FIGS. 1 and 2, a conventional pager receiver will be described at first for a better understanding of the present invention. The pager receiver includes a housing 10 of a substantially rectangular parallelopiped form. The housing 10 comprises a casing 12 and a cover member 14 which is placed at an upper end of the casing 12. Each of the casing 12 and the cover member 14 is an opaque material such as ABS resin or polycarbonate.

The housing 10 has a display panel 16 and first and second translucent portions 21 and 22. The display panel 16 is disposed at a top of the cover member 14 approximately centrally thereof. The first translucent portion 21 is located adjacent one end of the display panel 16. The second translucent portion 22 is located adjacent another end of the display panel 16.

The display panel 16 comprises a display element indicated by numerals 045-932-1111 and a protecting plate 24 (FIG. 2) for protecting the display element and is for displaying a message of, for example, a telephone number which should be dialled by a person carrying the pager receiver. The protecting plate 24 is a transparent rectangular plate and has a peripheral portion attached to a flange portion 26 of the cover member 14 by adhesion. By way of example, the protecting plate 24 is made of a thermo-plastic resin and heat-pressed to the flange portion 26. Alternatively, a pressure sensitive adhesive double coated tape is laid between the flange portion 26 and the peripheral portion of the protecting plate 24.

The pager receiver further comprises a light emitting, a light sensing, and an illuminating element in the housing 10 in the manner which will later be illustrated. The light emitting element is disposed adjacent to the first translucent portion 21. When a call is received by the pager receiver, the light emitting element emits light through the first translucent portion 21 to indicate reception of the call. The light sensing element is disposed adjacent to the second translucent portion 22 to sense an illuminance at the second translucent portion 22 and to produce a control signal which is representative of the illuminance. The illuminating element is responsive to the control signal and is for illuminating the display panel 16 when the illuminance is below a threshold value.

The conventional pager receiver is disadvantageous in view of the manufacturing cost and the design thereof. This is because the housing 10 has two, namely, the first and the second translucent portions 21 and 22 as will be clear in FIG. 1. In addition, the protecting plate 24 is apt to be off from the cover member 14. This is because the protecting plate 24 is only attached to the flange portion 26.

Referring to FIG. 3, description will be made in relation to a pager receiver according to an embodiment of the present invention. Similar parts are designated by like reference numerals.

The housing 10 has a common translucent portion 30 which is located adjacent one end of the display panel 16 so as to correspond to the first translucent portion 21 shown in FIG. 1. Attention will be directed to absence of the second translucent portion 22 shown in FIG. 1. The common translucent portion 30 comprises a semitransparent member which is made of, for example, an acrylic resin of a red color. The semitransparent member comprises a first and a second portion 31 and 32. The first portion 31 is located at a side of the cover member 14. The second portion 32 is located at the top of the cover member 14.

With the above, it is possible to manufacture the housing 10 at a relatively low cost because of only one common translucent portion 30. In addition, degree of freedom increases as regards the design of the housing 10. For example, the common translucent portion 31 may be located adjacent another end of the display panel 16.

Referring to FIG. 4, the pager receiver further comprises a circuit board 34 in the housing 10. The circuit board 34 is fixed to the housing 10 and is for mounting various electronic parts, such as the light emitting and the light sensing elements depicted at 36 and 38. The light emitting and the light sensing elements 36 and 38 are adjacent to the first and the second portions 31 and 32 of the semitransparent member, respectively. As a result, the semitransparent member serves to protect each of the light emitting and the light sensing elements 36 and 38.

The circuit board 34 has an electronic circuit thereon. The light emitting element 36 may be a light-emitting diode electrically coupled to the electronic circuit. When the call is received, the electronic circuit makes the light emitting element 36 emit light for indicating reception of the call.

The light sensing element 38 may be a phototransistor electrically coupled to the electronic circuit. The photo-transistor is for sensing an illuminance at the second portion 32 to produce a control signal representative of the illuminance. Responsive to the control signal, the electronic circuit produces a driving signal which is similar to that described in the above-referenced United States Patent and which will therefore be omitted from the instant specification.

Referring to FIGS. 5 through 8, the display element is mounted as indicated at 42 on a mounting member (not shown) under the protecting plate 24. As a result, the protecting plate 24 serves to protect the display element 42. The display element 42 is a liquid crystal display, which can be illuminated by the illuminating element depicted at 44.

The illuminating element 44 comprises a reflector 46 and a plurality of light emitting diodes, such as two light emitting diodes 48, which are held within the reflector 46. Responsive to the driving signal, the light emitting diodes 48 emit light for illuminating the display element 42 through the reflector 46 to uniformly illuminate the display element 44.

The flange portion 26 defines a rectangular opening 52 at the top of the cover member 14. The cover member 14 has a stepped portion 54 (FIG. 7) which surrounds a mounting space for the protecting plate 24 and from which the flange portion 26 extends inwardly to define the opening 52. For fixedly holding the protecting plate 24 in the mounting space, the cover member 14 has a first and a second holding arrangement which will presently be described.

The first holding arrangement comprises a recessed portion 56 recessed into the stepped portion 54 adjacent to one end of the opening 52 as clearly shown in FIGS. 6 and 7. The second holding arrangement comprises two holding protrusions (only one of which being shown in FIG. 5) 58 formed integrally with the flange portion 26 at positions adjacent to another end of the opening 52 in the manner which will presently become clear. Each of the holding protrusions 58 has a rod portion 62 and an engaging portion 64. The rod portion 62 is perpendicularly extended downwardly from the flange portion 26 and has a peripheral surface and a predetermined diameter. The engaging portion 64 is formed to a lower end of the rod portion 26 to radially outwardly extend from the peripheral surface of the rod portion 62.

The protecting plate 24 has an end portion, such as an engaging protrusion 66, at one end thereof and two through holes 68 at positions adjacent to another end thereof as clearly shown in FIG. 8. The engaging protrusion 66 is inserted into the recessed portion 56. The through holes 68 are received by the respective rod portions 62 as will shortly become clear. The engaging portion 64 is located under the protecting plate 24 in contact with a lower surface of the protecting plate 24. Therefore, the protecting plate 24 is fixedly attached to the cover member 14.

With reference to FIGS. 6 to 8, description will be made as regards the manner of attaching the protecting plate 24 to the housing 14. It will be assumed the a thermoplastic resin mass is moulded onto the cover member 14. As clearly shown in FIGS. 6 and 7, the cover member 14 is formed with two protrusions 72 before attaching the protecting plate 24 thereto. Each of the protrusions 72 has the predetermined diameter and serves as each of the holding protrusions 58.

The protecting plate 24 has a table portion 74 at a central portion thereof and a surrounding portion which surrounds the table portion 74. The surrounding portion is lower than the table portion 74. An adhesive tape 76 is fixedly attached to the surrounding portion. The adhesive tape 76 is of a pressure sensitive adhesive double coated tape and is circumferentially extended along the surrounding portion.

In order to attach the protecting plate 24 to the cover member 14, the engaging protrusion 66 is snugly received at first in the recessed portion 56. Next, the protecting plate 24 is brought into press contact with the flange portion 26 with the through holes 68 received by the respective protrusions 72. As a result, the protecting plate 24 is attached to the flange portion 26 through the adhesive tape 76. In addition, an end portion of each of the protrusions 72 is heat-pressed to make the end portion provide the engaging portion 64. As a result, the protecting plate 24 is tightly attached to the cover member 14. With this, it becomes incapable to remove the protecting plate 24 from the cover member 14. Moreover, the adhesive tape 76 serves to close a gap left between the flange portion 26 and the protecting plate 24.

While the present invention has thus far been described in connection with the pager receiver, it will now readily be possible for those skilled in the art to put this invention into practice in various other manners. For example, the engaging protrusion may be more than one in number. The through holes may be one in number or more than three.

What is claimed is:

1. In a pager receiver comprising, in a housing having a display panel and a translucent portion, a light emitting element for indicating reception of a call, a light sensing element for sensing an illuminance at said translucent portion to produce a control signal representative of said illuminance, and an illuminating element for illuminating said display panel when the illuminance represented by said control signal is below a threshold value, the improvement wherein said light emitting element is disposed adjacent to said translucent portion such that said translucent portion is shared by said light sensing and light emitting elements.

2. A pager receiver as claimed in claim 1, wherein:
   said housing comprises a stepped portion which surrounds a mounting space for said display panel and has a recessed portion adjacent to one end of said mounting space;
   said display panel comprising a display element and a protecting plate for protecting said display element, said protecting plate having an end portion which is received in said recessed portion.

3. A pager receiver as claimed in claim 2, wherein:
   said housing comprises a flange portion inwardly extended from said stepped portion and a rod portion perpendicularly extended from said flange portion;
   said protecting plate having a through hole at an end opposite to said end portion, said through hole being for receiving said rod portion.

4. A pager receiver as claimed in claim 3, said rod portion having a peripheral surface, wherein:
   said housing further comprises an engaging portion radially outwardly extended from said peripheral surface in contact with a back surface of said protecting plate.

5. A pager receiver as claimed in claim 4, wherein said housing further comprises an adhesive tape between said protecting plate and said flange portion to attach said protecting plate to said flange portion.

6. A pager receiver as claimed in claim 5, wherein said adhesive tape is of a pressure sensitive double coated tape.

7. A pager receiver as claimed in claim 1, said housing having a side and a top adjacent to said side, said translucent portion comprising a first and a second portion located at said side and said top, respectively, said display panel being disposed at said top, wherein said light emitting and said light sensing elements are disposed to face said first and said second portions, respectively.

* * * * *

UNITED STATES PATENT AND TRADEMARK OFFICE
CERTIFICATE OF CORRECTION

PATENT NO. : 4,876,537
DATED : October 24, 1989
INVENTOR(S) : Oyamada

It is certified that error appears in the above-identified patent and that said Letters Patent is hereby corrected as shown below:

On the title page, item [57]:
Astract, line 8, after "is" insert --for--.

Signed and Sealed this

Twenty-second Day of January, 1991

Attest:

HARRY F. MANBECK, JR.

*Attesting Officer*   *Commissioner of Patents and Trademarks*